United States Patent
Miyata et al.

(10) Patent No.: US 7,394,804 B2
(45) Date of Patent: Jul. 1, 2008

(54) MESSAGE CONVERSION SERVER AND IP TELEPHONE

(75) Inventors: Tatsuhiko Miyata, Kokubunji (JP);
Kenichi Sakamoto, Kawasaki (JP);
Minoru Hidaka, Kodaira (JP);
Kazuyoshi Hoshino, Komae (JP);
Satoshi Kiyotou, Fujisawa (JP);
Kazuma Yumoto, Hachiouji (JP)

(73) Assignee: Hitachi, Ltd., Tokyo (JP)

( * ) Notice: Subject to any disclaimer, the term of this patent is extended or adjusted under 35 U.S.C. 154(b) by 894 days.

(21) Appl. No.: 10/620,691

(22) Filed: Jul. 17, 2003

(65) Prior Publication Data

US 2005/0100008 A1    May 12, 2005

(30) Foreign Application Priority Data

Jan. 22, 2003  (JP)  ............... P2003-012987

(51) Int. Cl.
*H04L 12/66* (2006.01)
(52) U.S. Cl. ............ 370/352; 370/356; 379/142.02
(58) Field of Classification Search ............ 370/352, 370/356, 389, 351, 385, 358; 379/142.02; 709/240

See application file for complete search history.

(56) References Cited

U.S. PATENT DOCUMENTS 6,160,876 A * 12/2000 Moss et al. ............ 379/142.02

| | | | |
|---|---|---|---|
| 6,959,009 B2 | 10/2005 | Asokan et al. | |
| 2004/0001509 A1 * | 1/2004 | Zhang et al. | 370/466 |
| 2007/0094412 A1 * | 4/2007 | Sollee | 709/245 |

FOREIGN PATENT DOCUMENTS

| JP | 2003009231 | 1/2003 |
|---|---|---|
| JP | 2003-009231 | 10/2003 |

OTHER PUBLICATIONS

T. Narten, "Privacy Extensions for Stateless Address Autoconfiguration in IPv6" Network Working Group Request for Comments: IBM/Microsoft Research, Jan. 2001, pp. 1-13.

(Continued)

*Primary Examiner*—Ricky Q. Ngo
*Assistant Examiner*—Dady Chery
(74) *Attorney, Agent, or Firm*—Mattingly, Stanger Malur & Brundidge, P.C.

(57) ABSTRACT

Session Initiation Protocol (SIP), a protocol used in VoIP (Voice over IP) communications, enables a caller to send a SIP message to a callee with his/her UserID concealed from the callee, which in turn, prevents A SIP server from making an attempt to manage the caller. If the same IP Telephone address is used whenever the IP call is made, a third party may guess the IP address easily during conversation. The SIP message sent by the caller is converted and conversion tables are managed by the SIP server. The IP Telephone modifies its IP address for each IP call. Thus, the caller can make a call to the callee with his/her UserID concealed from the callee using the SIP server with a message conversion function and communications carriers having SIP servers installed to manage the callers using their conversion tables. It is difficult to any malicious third party to guess the IP Telephone address, because the IP Telephone address is modified for each call.

12 Claims, 24 Drawing Sheets

OTHER PUBLICATIONS

J. Peterson, A Privacy Mechanism for the Session Initiation Protocol (SIP), Network Working Group, Request for Comments: 3323, Nov. 2002, pp. 1-20.

RFC 3261 SIP: Session Initiation Protocol, Jun. 2002, Rosenberg, et al., Standards Track, pp. 213-220.

Rfc2327, SDP: Session Description Protocol, Apr. 1998, Handley & Jacobson, Standards Track, pp. 1-43.

RFC 1889, RTP: A Transport Protocol for Real-Time Application, Jan. 1996, Schulzrinne et al., Standard Track, pp. 1-5.

Narten, T. et al., "Privacy Extensions for Stateless Address Autoconfiguration in IPv6", Network Working Group, Jan. 2001.

* cited by examiner

---- SIP MESSAGE PATH
—— MAIN SIGNAL PATH

FIG.10

```
To:UserB<sip:userb@c.ne.jp>
From:UserA<sip:usera@a.ne.jp>
Call-ID:125533268@alpha.a.ne.jp
Contact:<sip:userb@c.ne.jp>
Subject:Hello UserB
Content-Type:application/sdp
```

```
To:UserB<sip:userb@c.ne.jp>
From:Anonymous<sip:anonymous@a.ne.jp>
Call-ID:125533268@alpha.a.ne.jp
Contact:<sip:userb@c.ne.jp>
Subject:Hello UserB
Content-Type:application/sdp
```

FIG.11

```
v = 0
o = UserA 5435 5435 IN IP6
3ffe:2388:3341:2398:3456:3456:856A:90BE
c = IN IP6
3ffe:2388:3341:2398:3456:3456:856A:90BE
m = audio 49170 RTP/A VP0
a = rtpmap : 0 PCMU/8000
m = video 53000 RTP/A VP32
a = rtpmap : 32 MPV/90000
```

| ANONYMOUS USERID | USERID |
|---|---|
| ANONYMOUS 1 | USER A |
| ANONYMOUS 2 | USER C |
| ... | ... |
| | |

------- SIP MESSAGE PATH
―――― MAIN SIGNAL PATH

FIG.17

```
Via: SIP/2.0/UDP b.ne.jp          221
     SIP/2.0/UDP a.ne.jp       222
To: UserB<sip:userb@c.ne.jp>   224
From:UserA<sip:usera@a.ne.jp>
Call-ID:125533268@alpha.a.ne.jp
Contact:<sip:userb@c.ne.jp>       225
Subject:Hello UserB
Content-Type:application/sdp
```

223

```
Via: SIP/2.0/UDP c.ne.jp       232    231
To: UserB<sip:userb@c.ne.jp>       234
From:Anonymous<sip:anonymous@none.ne.jp>
Call-ID:125533268@none.ne.jp
Contact:<sip:userb@c.ne.jp>       235
Subject:Hello UserB
Content-Type:application/sdp
```

To:Bob<sip:bob@c.ne.jp>
From:Alice<sip:alice@a.ne.jp>
Call-ID:125533268@alpha.a.ne.jp
Contact:<sip:bob@c.ne.jp>
Subject:Hello UserB
Content-Type:application/sdp

325

To:Bob<sip:bob@c.ne.jp>
From:Anonymous<sip:anonymous@a.ne.jp>
Call-ID:125533268@alpha.a.ne.jp
Contact:<sip:bob@c.ne.jp>
Subject:Hello UserB
Content-Type:application/sdp

331

Via: SIP/2.0/UDP b.ne.jp
     SIP/2.0/UDP a.ne.jp
To: Bob<sip:bob@c.ne.jp>
From:Anonymous<sip:anonymous@a.ne.jp>
Call-ID:125533268@a.ne.jp
Contact:<sip:bob@c.ne.jp>
Subject:Hello UserB
Content-Type:application/sdp

335

Via: SIP/2.0/UDP c.ne.jp
To: Bob<sip:bob@c.ne.jp>
From:Anonymous<sip:anonymous@none.ne.jp>
Call-ID:125533268@none.ne.jp
Contact:<sip:bob@c.ne.jp>
Subject:Hello UserB
Content-Type:application/sdp

FIG.23

| USERID | CALL-ID |
|---|---|
| USER A | 125533268 |
| USER C | 118654579 |
| ... | ... |
| | |

| ANONYMOUS USERID | USERID |
|---|---|
| ANONYMOUS 1 | USER A |
| ANONYMOUS 2 | USER C |
| ... | ... |
| | |

FIG.24

| CALL-ID | DOMAINID |
|---|---|
| 125533268 | a.ne.jp |
| 118654579 | f.ne.jp |
| ... | ... |
| | |

FIG.27

```
                                            420
                                           /
   Via: SIP/2.0/UDP beta.a.ne.jp
        SIP/2.0/UDP alpha.a.ne.jp    421
                                     423
   To: Bob<sip:bob@b.ne.jp>
422 From:Alice<sip:alice@a.ne.jp>
   Call-ID:125533268@alpha.a.ne.jp
                                     424
   Contact:<sip:bob@beta.b.ne.jp>
   Subject:Hello UserB
   Content-Type:application/sdp
```

```
                                            425
                                           /
   Via: SIP/2.0/UDP a.ne.jp    426
                                              428
427 To: Bob<sip:bob@b.ne.jp>
   From:Anonymous<sip:anonymous@a.ne.jp>
   Call-ID:125533268@a.ne.jp    429
   Contact:<sip:bob@beta.b.ne.jp>
   Subject:Hello UserB
   Content-Type:application/sdp
```

To:184 1234567<sip:1234567>
From:UserA<sip:usera@a.ne.jp>
Call-ID:125533268@alpha.a.ne.jp
Contact:<sip:1234567>
Subject:Hello UserB
Content-Type:application/sdp 560-2

To:UserB<sip:userb@b.ne.jp>
From:UserA<sip:usera@a.ne.jp>
Call-ID:125533268@alpha.a.ne.jp
Contact:<sip:userb@b.ne.jp>
Subject:Hello UserB
Content-Type:application/sdp — 571
X-○○:Anonymous Message

MESSAGE CONVERSION SERVER AND IP TELEPHONE

BACKGROUND OF THE INVENTION

The present invention relates to a calling method for use when a caller makes a call to a callee in a one-to-one communication mode on the Internet.

Non-patent documents listed below are referred to in the following description:

[Non-patent document 1]
IETF RFC3261
[Non-patent document 2]
IETF RFC2327
[Non-patent document 3]
IETF RFC1889

In recent years, there has been a tendency to integrate exchange-based telephone communications networks into IP networks as part of a rapid advance in IP network technology. Telephone communications carriers have a plan to transfer data under voice (hereafter, simply referred to as DUV) on their own IP networks through Voice over IP (hereafter, simply referred to as VoIP). VoIP consists of two protocols, one protocol controlling call signaling and sessions and the other protocol controlling DUV transfer. The Internet Engineering Task Force (hereafter, simply referred to as IETF) created the specifications of a Session Initiation Protocol (hereafter, simply referred to as SIP), which is designated in IETF RFC3261, defining the method for call signaling and sessions. For example, the Session Description Protocol (SDP), IETF RFC2327, is applicable to the description of a session, including an agreement on a codec and transfer rate to be internally used in SIP.

Although no specific DUV protocol is defined in SIP, a Real-time Transport Protocol (RTP), which is designated in RFC1889, is commonly used.

According to IETF RFC3261, SIP is a protocol wherein a SIP message, consisting of a SIP Start Line, a SIP message header, and a SIP message body, is sent/received between two calling parties via a SIP server to establish agreement concerning the call signaling mode on the callee side, the voice, the image protocol and the bit rate to be used during conversation. Generally, the SIP Start Line describes the behavior of the message originator, the SIP message header describes the telephone number of a callee, the SIP server to be passed, and the Call-ID (call origination administration number), and the SIP message body describes the proposed voice, image protocol, and bit rate to be used during conversation.

Now, a procedure will be described briefly ranging from the start to the end of a two-party conversation through use of SIP, as described in IETF RFC3261, and the problems which arise with use of the procedure will be explained.

FIG. 1 is a network diagram illustrating a two-party conversation carried out through use of SIP. FIG. 2 is a sequence diagram illustrating the flow of a two-party conversation through use of SIP.

In FIG. 1, UserA, who belongs to a domain 3-1 and has an IP Telephone 2-1, makes a call to UserB, who belongs to a domain 3-3 and has an IP Telephone 2-2, via SIP servers 1-1 to 1-3.

First. UserA sends a Start Line INVITE and a SIP message for UserB to the SIP server A1-1 to establish a call with UserB (11). The SIP server A1-1, when receiving the INVITE message, adds a VIA header to its message header and transfers the SIP message to the SIP server B1-2. At that time, it also sends the SIP message containing a Start Line 100Trying to the IP Telephone 2-1, which is the callee (destination) of the message (12). The SIP servers B1-2 and C1-3, when receiving the SIP message, take the same actions and transfer the message to the UserB's IP Telephone 2-2.

The IP Telephone 2-2, when receiving the SIP message, sends a Start Line 180Ringing and a SIP message for UserA to the SIP server C1-3 (13) to sound a ringing tone on the UserB side. The SIP message containing a Start Line 180Ringing terminates at the IP Telephone 2-1 via the SIP server.

The IP Telephone 2-2, when UserB picks up the telephone receiver, sends a Start Line 200OK and a SIP message for UserA (14), which in turn, terminates at the IP Telephone 2-1 via the SIP server. The IP Telephone 2-1 sends back an acknowledge (ACK) signal in response to the message (15), and, when the ACK is received, a voice packet passes through a main signal path, enabling the two parties to initiate a conversation between them (16).

At the end of the conversation, UserA's IP Telephone 2-1 sends a Start Line BYE and a SIP message for UserB (17), which in turn, terminates at the IP Telephone 2-2 via the SIP server. In response to the message, the IP Telephone 2-2 sends back the ACK to the IP Telephone 2-1 via the SIP server (18). When the ACK is received, the conversation ends.

SIP is a protocol for sending and receiving SIP messages between a caller and a callee. A UserID and its DomainID are described in the headers, "From" specifying the caller contained in the message header, "To" specifying the callee, and Via specifying the SIP servers to be passed (proxy mode), because such information can be delivered as it is when the callee sends it back. To establish a session with the callee through SIP, the caller describes the IP address of his/her own terminal or an assigned DomainID in the headers.

With regard to VoIP, a protocol which informs the callee of no UserID (e.g. telephone number or UserID) of the caller, a mode has been proposed in IETF RFC3261 whereby the caller terminal creates a random UserID, registers the random UserID and the IP address of the terminal in the SIP server, and originates a call with the random UserID designated as the caller. Through this protocol, the whole procedure for making a Caller Anonymous Call is performed on the caller side.

If the IETF-supported communication mode, in which the caller makes a Caller Anonymous Call with his/her UserID concealed, is used in the SIP system, only the random UserID is registered in the SIP server. For this reason, the caller would make a Caller Anonymous Call not only to the callee, but also to the SIP server at the same time. The SIP server is difficult to control, and it is difficult to manage calls because it cannot guess the real UserID from the UserID registered in it. In the IP telephone services provided by communications carriers and others, user management is required, for example, caller identification, service permission/denial determination, and talk time management.

If a malicious third party intercepts a SIP message, he/she can identify the caller, the caller's SIP-URL, and the assigned DomainID as described in the SIP message, causing mischief, such as nuisance calls.

In addition, if the malicious third party knows the IP address of the IP Telephone, he/she can transfer a vast amount of packets to the IP Telephone after the end of conversation, making an attack, for example, DOS (Denial of Service), thereby disturbing processing on the equipment at a high possibility.

SUMMARY OF THE INVENTION

An object of the present invention is to provide a method of effecting a "Non caller informed call", which enables the SIP servers to manage caller information (UserID identifying the UserID of the caller sending the SIP message and his/her DomainID), while concealing the information from the callee and a malicious third party.

Another object of the present invention is to make it difficult for a third party to identify the IP address assigned to the IP Telephone, thereby to minimize any problems he/she may cause when he/she knows the IP address.

According to one aspect of the present invention, a packet forwarding device transmits a message sent by a caller to a specified callee, wherein the device has a processing part for providing at least either a function for converting or a function for erasing at least part of the message sent by the caller upon his/her request and a control part for determining whether at least the part of the message should be converted or erased, and it converts or erases at least part of the message based on the determination in the control part. This mechanism enables information identifying the caller to be concealed from the callee.

At least the part of the message that is converted or erased, as it described above, may be one of or any combination of:
(1) a part identifying the user on a calling side in the SIP message header on an IP is packet payload containing the message;
(2) a part identifying the caller's domain in the SIP message header on the IP packet payload containing the message;
(3) a part of a Via tag in the SIP message header on the IP packet payload containing the message;
(4) a part indicating the Call-ID domain in the SIP message header on the IP packet payload containing the message; and
(5) a Dart identifying a UserID in the SIP message body on the IP packed payload containing the message.

It may be possible for the control part to analyze the content of the message, when receiving it and, if any given character string or header is detected, the processing part operates to convert or erase part of the message. Any given character string is a series of numeric characters contained in the position of the first numeric string, for example "184". Any given header is the SIP message header, and, when its extended header is detected, the above-mentioned processing part may convert or erase part of the message.

Additionally, it is preferable to provide a table, in which the correspondence between the contents of part of the message before and after conversion is contained. According to one aspect of the present invention, to conceal information on SIP-URL and the assigned domain of the caller, the SIP server that is installed at a relay point between the caller and the callee converts the SIP message. The SIP server with the message conversion function is characterized in that it provides a method for converting or erasing part of the message originated by the caller, a processing part for determining whether it should be converted or erased or not, a processing part for determining information to be used in conversion, and the table containing the rule of conversion.

According to an aspect of the present invention, in order to make it difficult for a third party to identify the IP address of a caller's IP Telephone, the IP Telephone creates or obtains a temporary IP address to be used only once when the SIP message is sent and discards it as soon as the conversation ends. The IP Telephone is characterized in that it provides a method for creating or obtaining the IP address in conjunction with the origination of the SIP message and for discarding it as soon as the conversation ends, a processing part for registering the temporary IP address in the SIP server, a processing part for canceling its registration from the SIP server, and a processing part for creating a random interface ID.

It is possible that, optionally, the step of converting the SIP message using the SIP server and/or the step of obtaining the temporary IP address using the IP Telephone may be used. According to another aspect of the present invention, the SIP telephone communication method involves a step of receiving an SIP message, a step of checking the SIP message for any request for Anonymous Call, a step of executing at least one of two operations, modification and deletion on at least part of the SIP message if any request is detected, and a step of sending the SIP message that has been processed as described above. It is preferable that if the request for Anonymous Call is detected, a modification is made on at least part of the SIP, and a table containing the correspondence between the contents before and after modification is created.

According to a second aspect of the present invention, the IP telephone communication method involves a process for modifying the caller address to a temporary address at the initiation of conversation and a process for discarding the temporary address at the end of conversation.

According to a third aspect of the present invention, the method for converting or erasing part of a message sent by the caller upon his/her request is characterized by a step of determining whether part of the message should be converted or erased, a step of determining information to be used in conversion, if it is determined to be modified, and a rule applicable to the conversion. In addition, a telephone set is characterized in that it involves a method which has step of modifying the address of a caller in conjunction with origination of the message every time he/she makes a call to prevent the address from being disclosed and a step of disposing the address indicating the different UserID that is used at the time of conversation as soon as the conversation ends; and the telephone set further provides a method for assigning the addresses indicating different UserIDs at the time of call origination and call receiving and a method for sending the user's call. The scope of the present invention includes the methods, devices, and systems described above.

As explained above, the invention achieves a function that is compatible with an exchange-based Anonymous Call function in an IP Telephone.

BRIEF DESCRIPTION OF THE DRAWINGS

FIG. 10 is a diagram showing the contents of a SIP message header that is unconverted and that is converted by a SIP server which has the message conversion function of the present invention;

FIG. 11 is a diagram of the content of a SIP message body (SDP) that has been unconverted by the SIP server with the message conversion function of the present invention;

FIG. 17 is a diagram showing the contents of the SIP message header that is unconverted and that is converted by a SIP server which has the message conversion function of the present invention;

FIG. 22 is a diagram showing the contents of the contents of the SIP message that is unconverted and that is converted by the SIP server which has the message conversion function of the present invention;

FIG. 23 is a diagram showing the contents of the conversion table stored on a SIP server which has the message conversion function of the present invention;

FIG. 24 is a diagram showing another example of the content of the conversion table stored on the SIP server which has the message conversion function of the present invention;

FIG. 27 is a diagram showing the contents of the SIP message header that is unconverted and that is converted by the SIP server with the message conversion function of the present invention;

FIG. 31 is a diagram showing the content of a SIP message header when a Caller Anonymous Call is made.

DETAILED DESCRIPTION OF THE PREFERRED EMBODIMENTS

Embodiment 1

Figure 1:
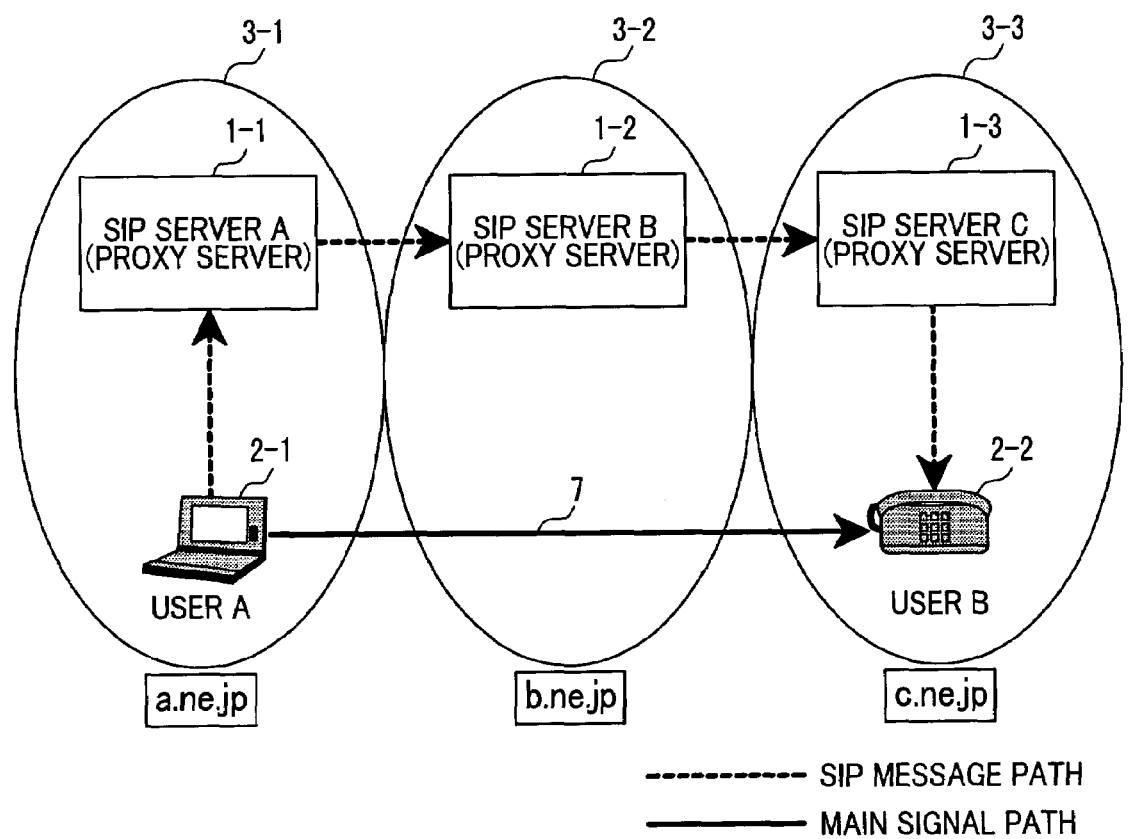
FIG. 1 is a schematic diagram showing an example of a SIP network of the type to which the present invention is applicable.
Figure 2:
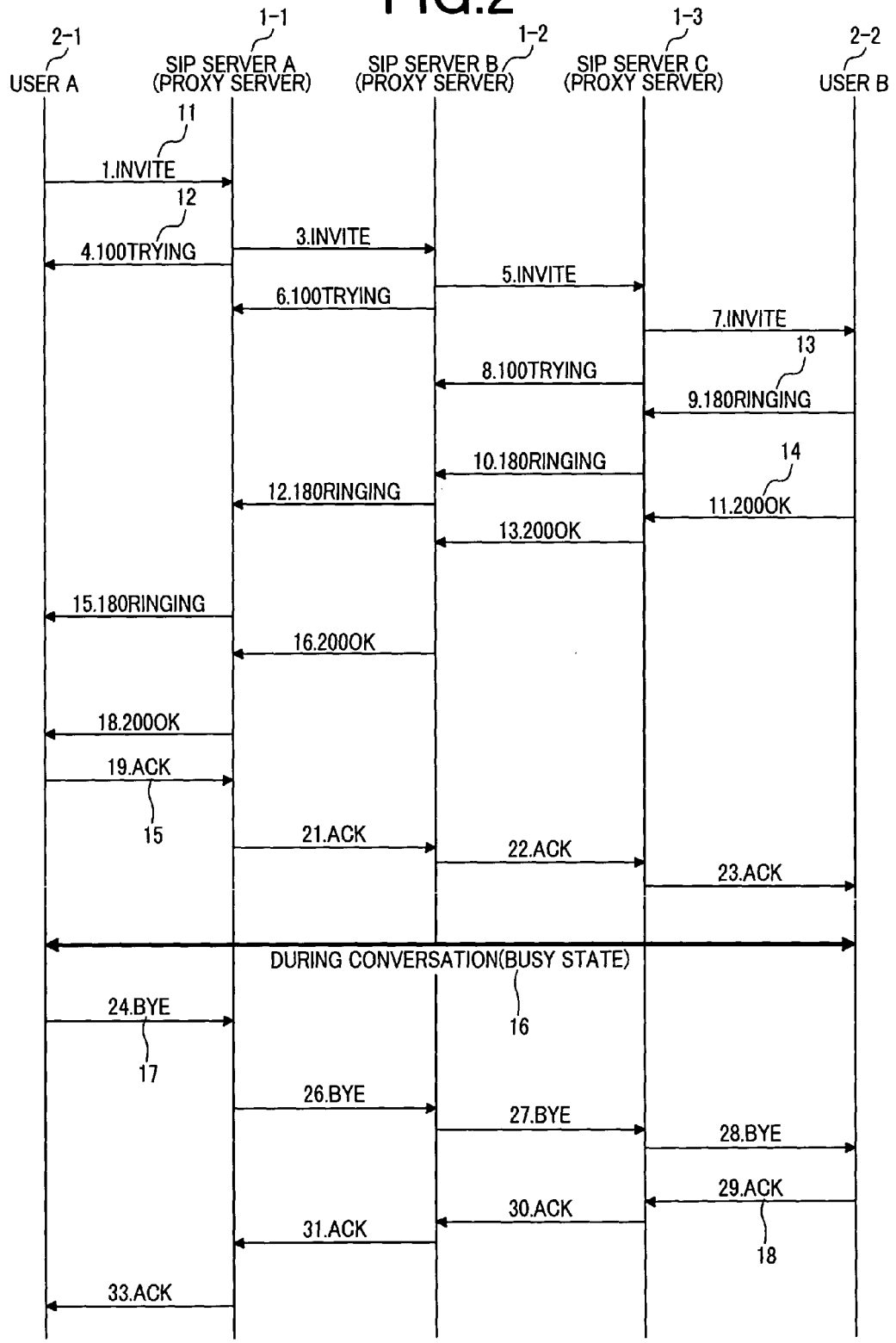
FIG. 2 is a sequence diagram showing an example of a procedure for making a call in the SIP network of FIG. 1.
Figure 3:
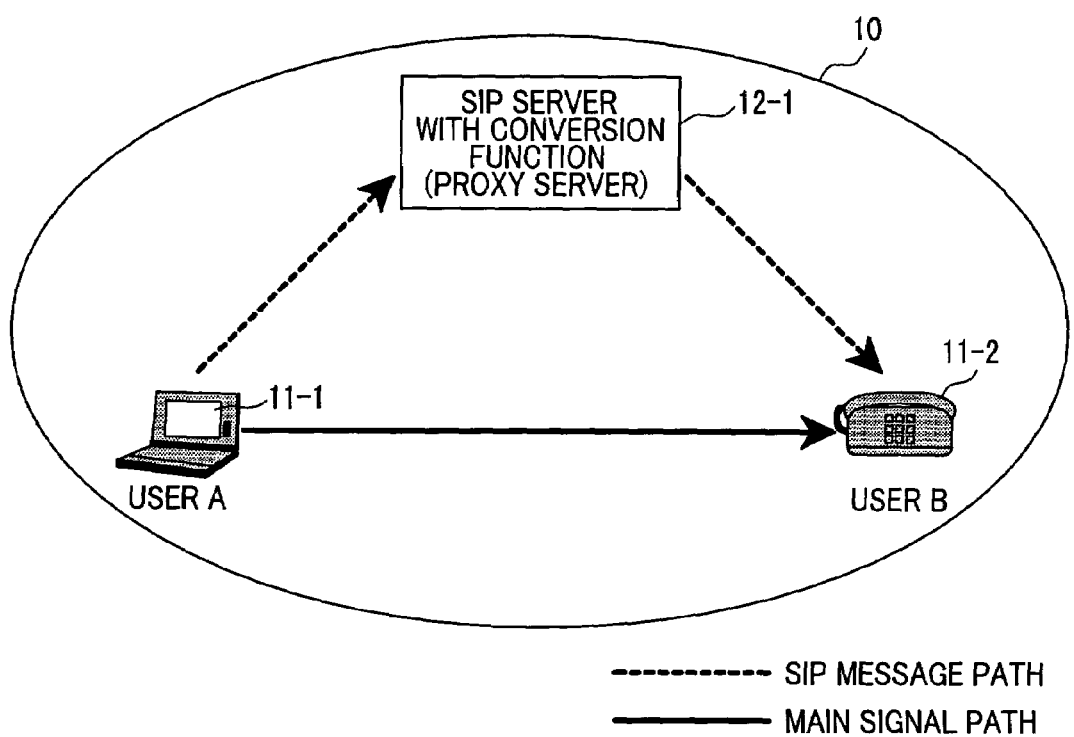
FIG. 3 is a schematic diagram showing an example of the SIP network of the present invention.
Figure 4:
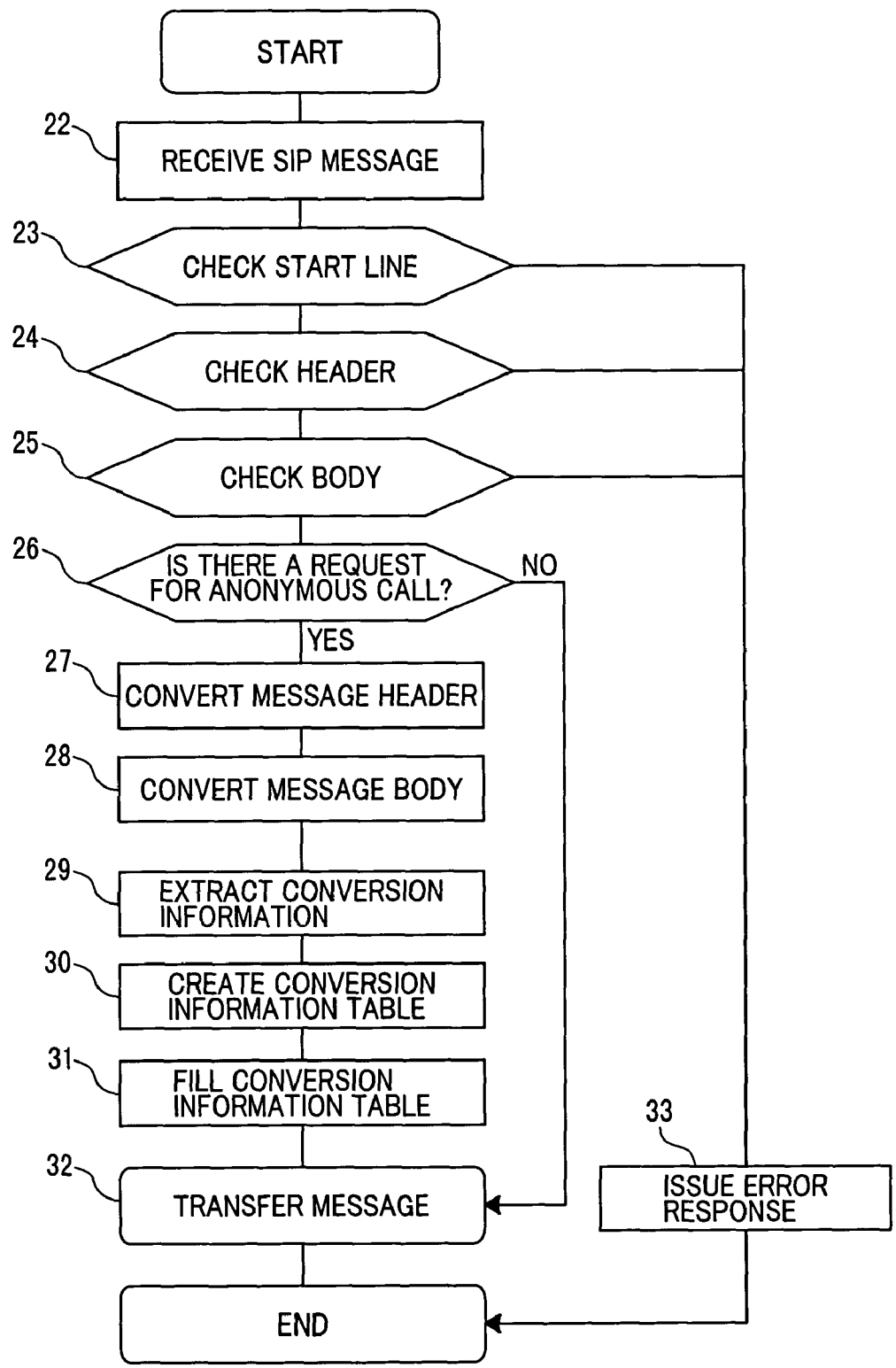
FIG. 4 is a flow chart showing the operational principle of an SIP server which has the message exchange function of the present invention.
Figure 5:
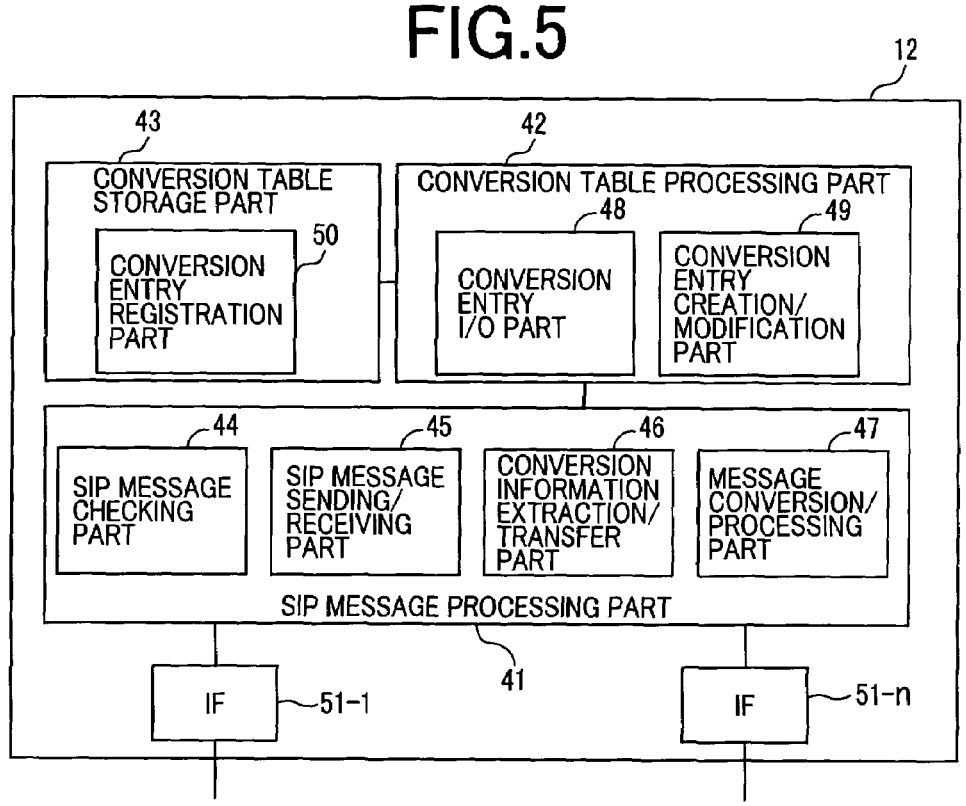
FIG. 5 is a block diagram of an SIP server which has the message exchange function of the present invention.
Figure 6:
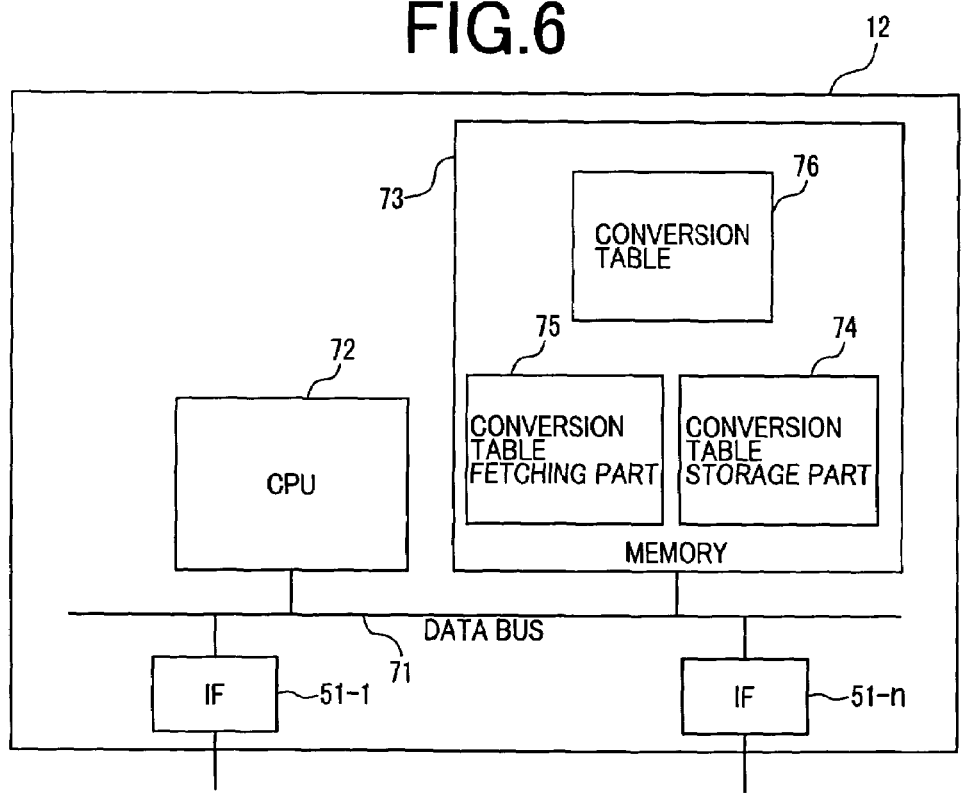
FIG. 6 is a block diagram of an SIP server which has the message exchange function of the present invention.
Figure 7:
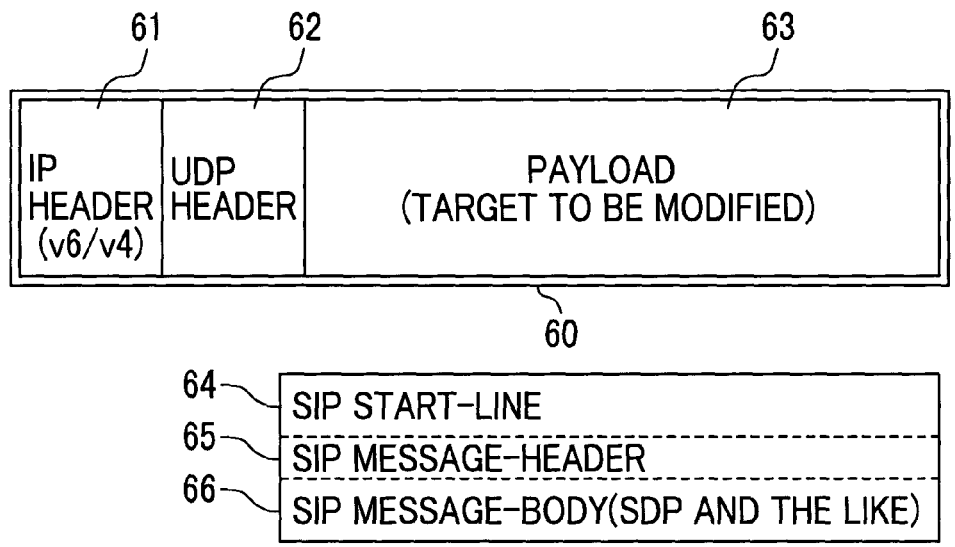
FIG. 7 is a diagram showing the format of an IP packet containing an SIP message.

FIG. 3 shows a first embodiment of an IP telephone line network using a SIP server having the message exchange function of the present invention. FIG. 4 is a flow chart illustrating the operational procedure of the SIP server 12-1 of FIG. 3. FIG. 5 is a functional block diagram of the SIP server 12-1. FIG. 6 is a block diagram showing the hardware configuration of the SIP server 12-1. FIG. 7 is a diagram showing an IP packet 60 containing a SIP message. In the IP packet 60, there are an IPv4/v6 header 61, a TCP/UDP header 62, and a payload 63, which includes a SIP Start Line 64, a SIP message header 65, and a SIP message body (SDP) 66.

Now, referring to FIG. 4 and FIG. 5, the operational principle of the SIP server 12-1, which has a message exchange function, will be is described.

First of all, The IP packet indicated in FIG. 7 is input via IF 51. Second, receipt of the SIP massage 22 is performed at a SIP message sending/receiving part 45, and a Start Line check 23, a Header check 24, and a body check 25 are performed by the SIP message checking part 44. If any error is detected in the SIP message, the process ends with the issuing of an error response notification 33.

If no error is detected, then a message conversion check 26 is performed during a message conversion request check 26 at a message conversion/processing part 47.

If no conversion request is detected, a Via header is described in the SIP message header 64 at the conversion/processing part 47, and then the SIP message is sent via IF 51. If a conversion request is issued with a flag 561 and 571 (see FIG. 31) indicating that a "No caller informed call" is to be originated, the step for converting message header conversion 27 and the step of converting the message body 28 are performed at the message conversion/processing part 47. These steps conceal information on the caller from the callee (destination). After the conversion, a step of extracting conversion information 29 is performed at a conversion information extraction/transfer part 46 to pick up header body information necessary for creating a conversion table. Then, a step of creating the conversion information table 30 is performed at a conversion entry creation/modification part 49, writing into the conversion information table 31 is performed at a conversion entry I/O part 48, and the converted entry is registered at a conversion entry registration part 50. The converted SIP message undergoes message transfer 32 at a SIP message sending/receiving part 45 via IF 51.

According to the embodiment of the present invention, the functions of the conversion entry creation/processing part 49 in the SIP message processing part 41 and the conversion table processing part 42 shown in FIG. 5 are executed on the CPU 72 shown in FIG. 6. The function of the conversion entry I/O part 48 shown in FIG. 5 is executed at a conversion table fetching part 75 shown in FIG. 6. The function of the conversion table storage part 43 shown in FIG. 5 is executed at a conversion table storage part 74 shown in FIG. 6.

Embodiment 2

Now, a more detailed embodiment will be described.

Figure 8:
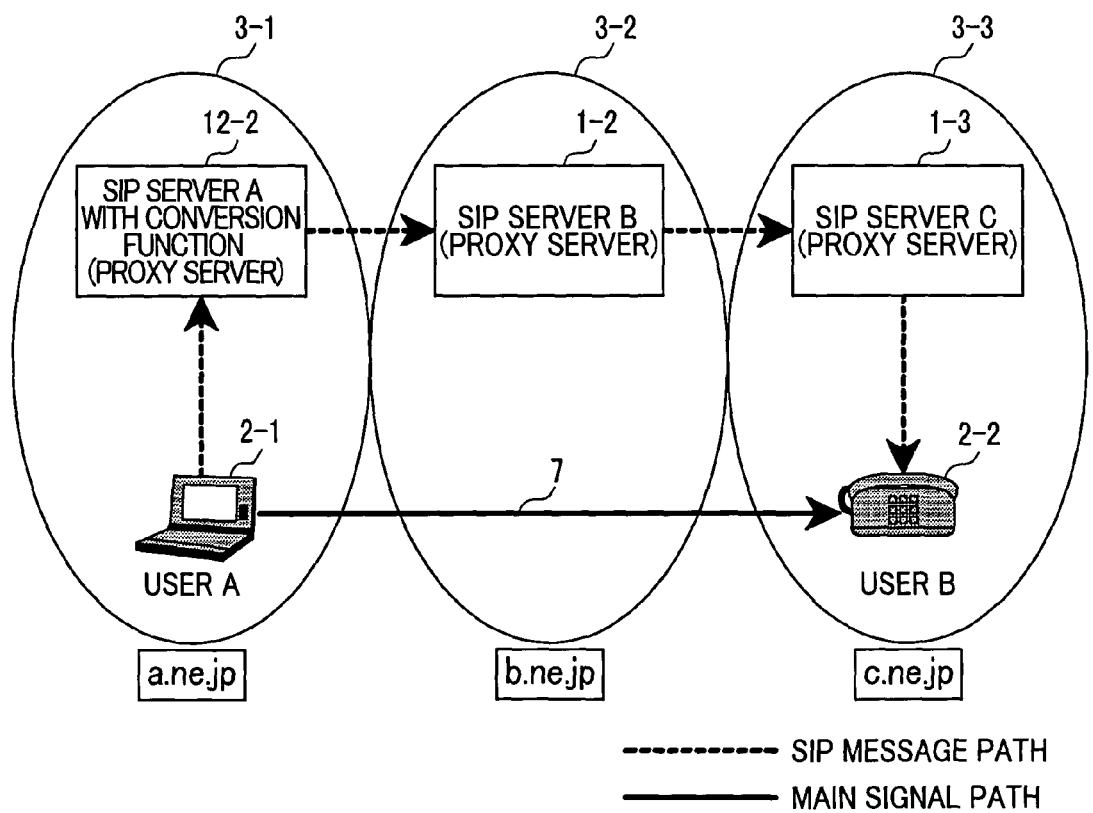
FIG. 8 is a schematic diagram showing an example of a network using an SIP server which has the message conversion function of the present invention.

FIG. 8 is a schematic of the network configuration of a second embodiment of the SIP server of the present invention.

Figure 9:
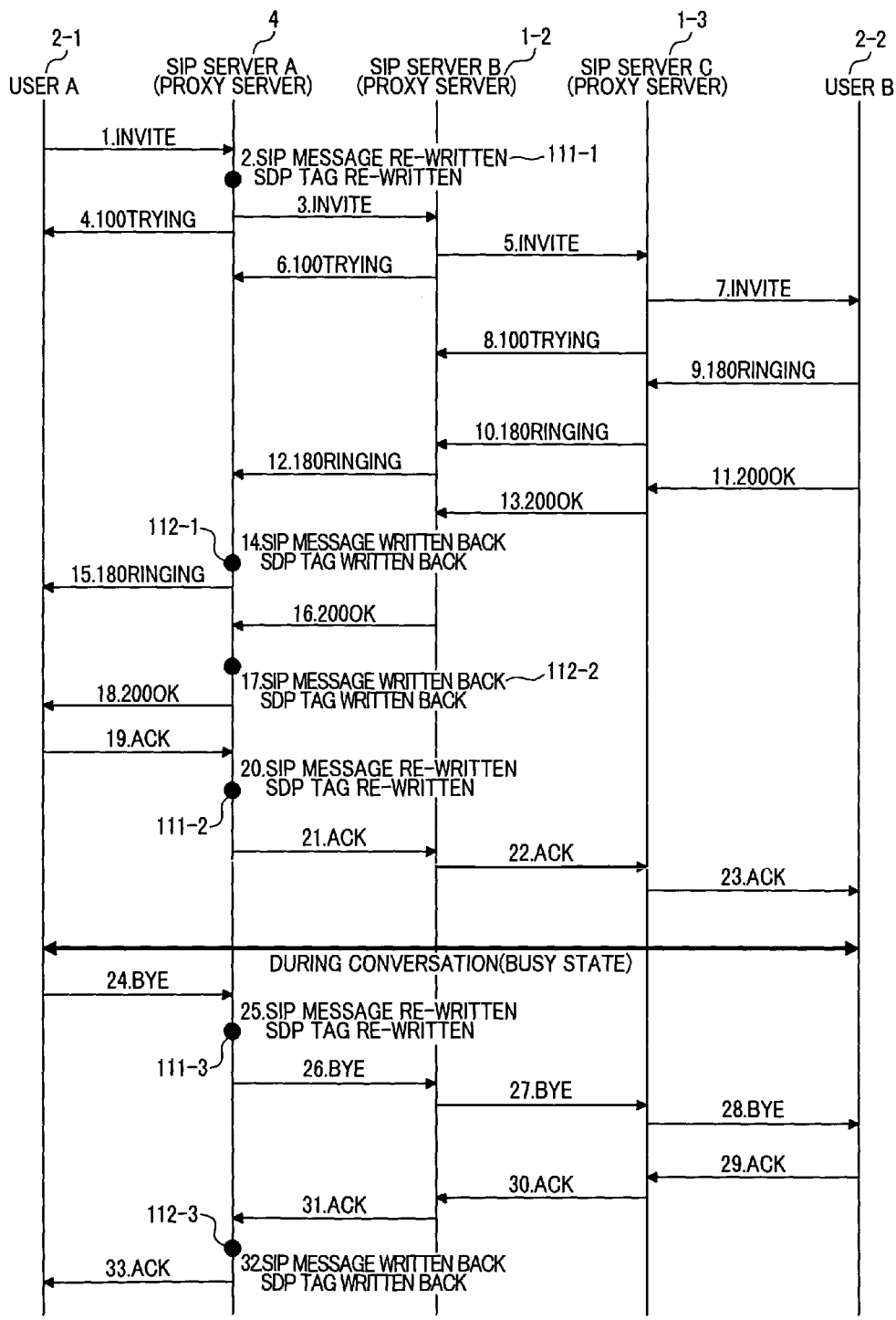
FIG. 9 is a sequence diagram showing a procedure for making a call in the example of the network using an SIP server which has the message conversion function of the present invention.

FIG. 9 is a sequence diagram of the communication procedure of the network of FIG. 8.

Figure 12:
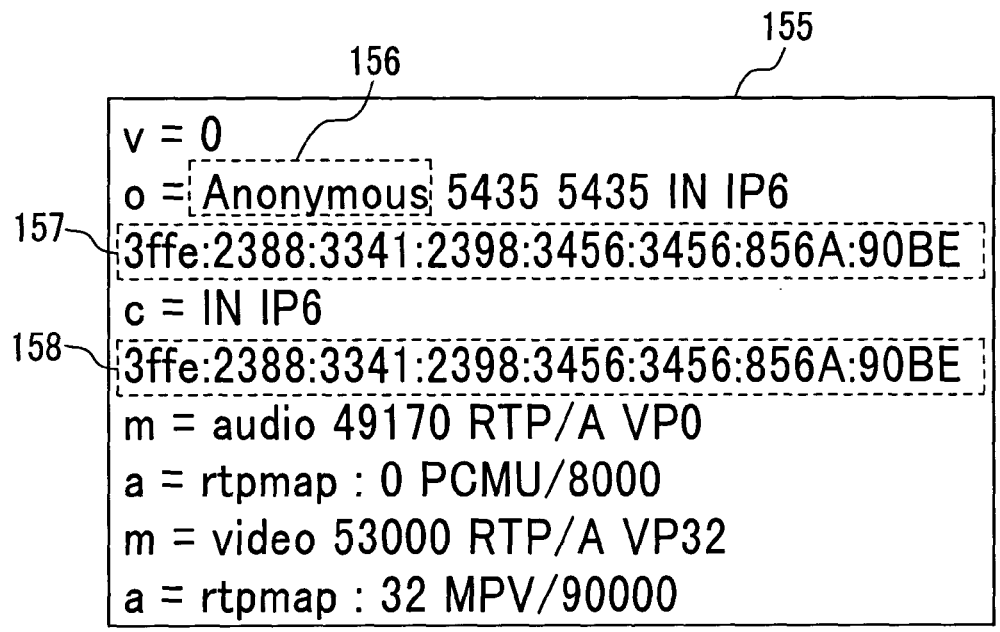
FIG. 12 is a diagram of the content of a SIP message body (SDP) that has been converted by the SIP server with the message conversion function of the present invention.

In the second embodiment, UserA makes a Caller Anonymous Call to UserB. The step of processing the Non caller informed call is performed on the SIP server A12-2, which has a message exchange function. The step of converting the SIP message is performed on the SIP server A (12-2) with a header conversion function used by the caller in sending the SIP message at the steps 111 and 112 in the sequence ranging from the start to the end of conversation, as shown in FIG. 9. Note that the SIP server with the conversion function behaves as described in connection with the first embodiment. FIG. 10, FIG. 11, and FIG. 12 show the content of the converted SIP message in the second embodiment.

FIG. 10 is a diagram showing the header part of the SIP message (65 in FIG. 7). In the upper part, the unconverted header is shown, and, in the lower part, the converted header is shown. In the second embodiment, a UserID 142 of the From tag and a part identifying the user of SIP-URL 143 in the unconverted header 141 are converted into, for example, character strings 147 and 148, such as Anonymous, from which the UserID of the caller cannot be guessed.

FIG. 11 is a diagram showing a body part of the SIP message (Unconverted). The body part of the SIP message is represented by 66 in FIG. 7.

FIG. 12 is a diagram showing the body part of the SIP message (converted). In this figure, the part identifying a UserID 152 of the message body (SDP) 151 of FIG. 11 is converted into Anonymous 156. The part 153 of FIG. 11, identifying the user's address to be used during conversation in an "o","c" tag, is converted into the IP address, if described in FQDN (Fully Qualified DomainID).

As described above, the present invention enables information on the caller to be concealed by converting information on the caller, based on which the callee can identify the UserID of the caller including the UserID 142 of the From tag, the part identifying the SIP-URL user 143, and the part 152 identifying the UserID of the message body (SDP).

Figure 13:
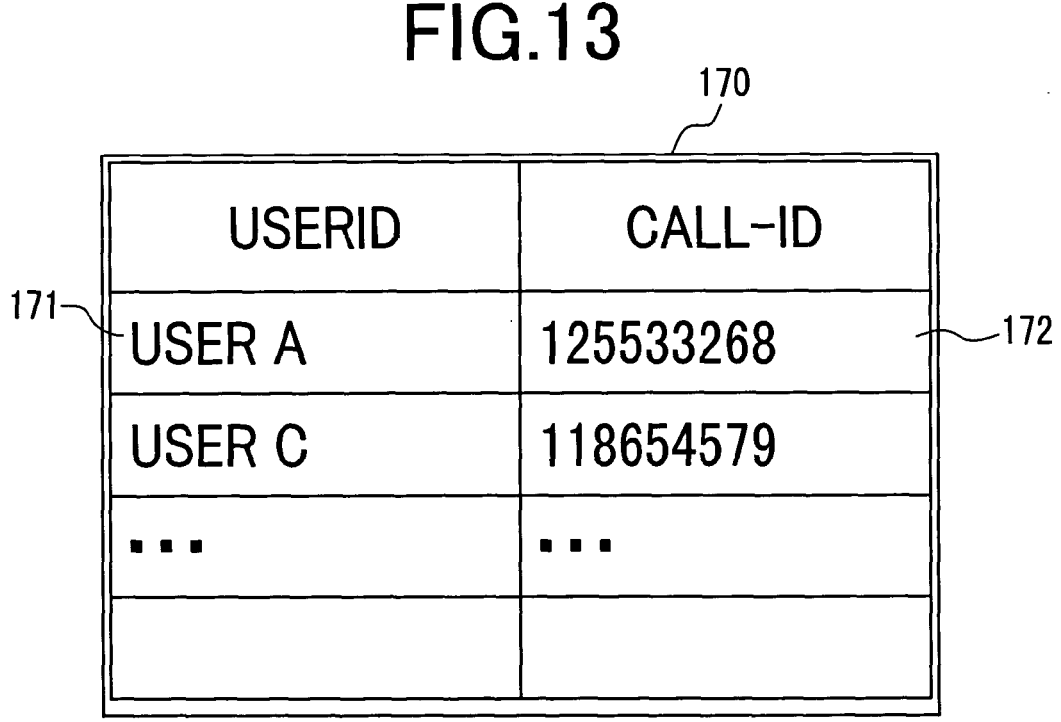
FIG. 13 is a diagram showing the content of the conversion table stored on the SIP server with the message conversion function of the present invention.
Figures 14, 15:
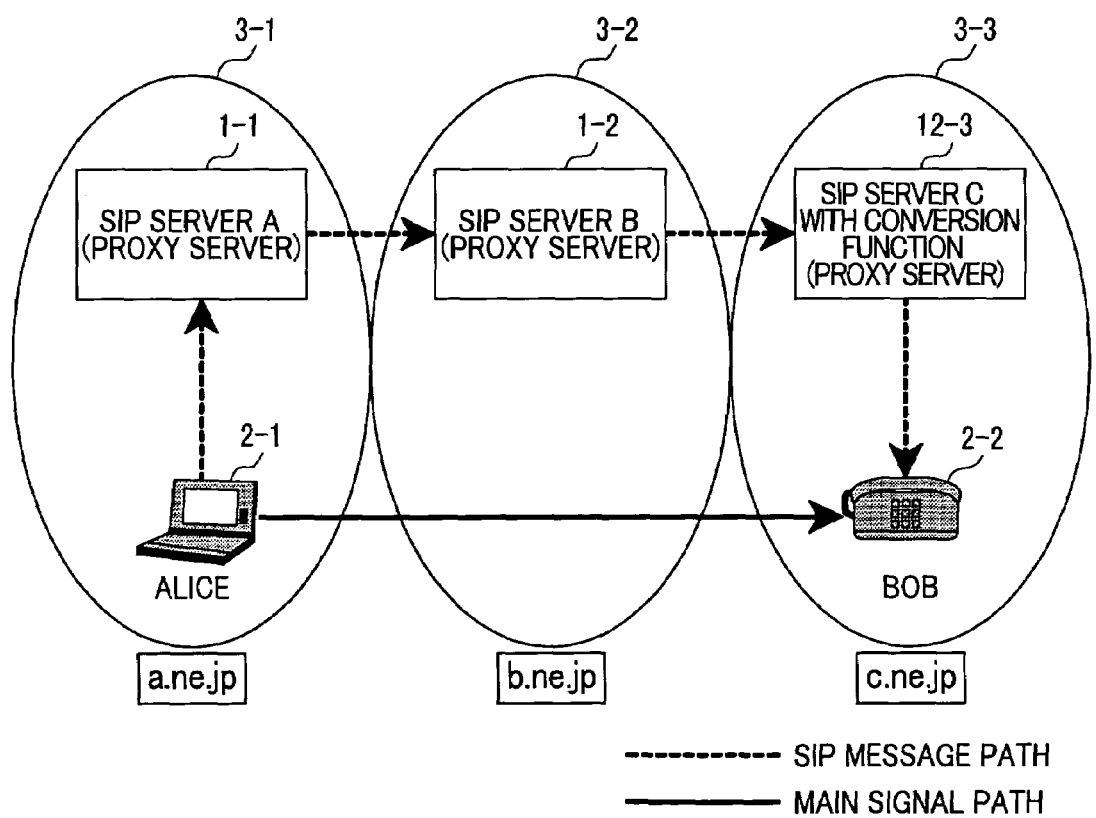
FIG. 14 is a diagram showing another example of the content of the conversion table stored on the SIP server with the message conversion function of the present invention.
FIG. 15 is a schematic diagram of a network using a SIP server which has the message conversion function of the present invention.

FIG. 13 and FIG. 14 are diagrams showing the conversion tables stored on the SIP server 12 with the conversion function in the first embodiment of the present invention. These conversion tables include the table 170, which associates all the UserIDs converted into the same Call-ID 172 with their real UserIDs 171, the table 180, which associates anonymous UserIDs 181 previously stored on the SIP server as "Anonymous1-100" with their real UserIDs 182, and others. Reference to these tables associating anonymous UserIDs 181 with Call-ID 172 makes it possible to effect successful routing of the SIP messages.

Embodiment 3

Figure 16:
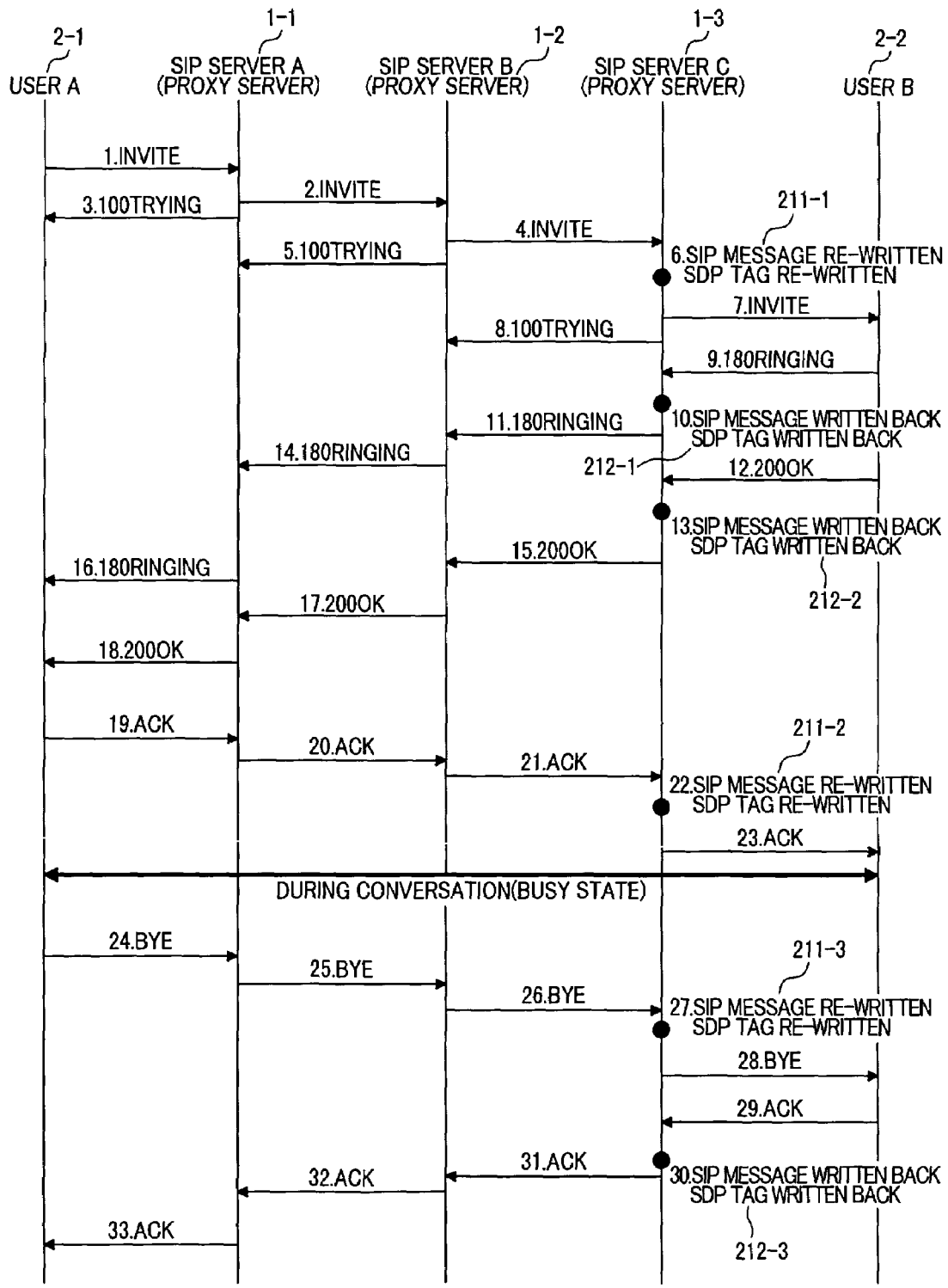
FIG. 16 is a sequence diagram showing the procedure for making a call in the network using the SIP server with the message conversion function of the present invention.

FIG. 15 is a schematic diagram showing the network configuration in a third embodiment of a SIP server which has the message conversion function of the present invention. Unlike the embodiment shown in FIG. 8, in this embodiment, anonymous processing is executed on the SIP server C. FIG. 16 is a sequence diagram showing the procedure for processing conversation on the network pf FIG. 15.

In this third embodiment of the present invention, UserA makes a Callee Anonymous Call to UserB. The step of converting the SIP message is performed on the SIP server C (12-3) with a header conversion function, which sends the SIP message at the steps 211 and 212 in the sequence ranging from the start to the end of conversation, as shown in FIG. 16. Note that the SIP server with the conversion function behaves as described in connection with the first embodiment.

FIG. 17 is a diagram showing the content of the SIP message converted on the SIP server with the message conversion function. Both of the unconverted and converted message headers are shown (65 in FIG. 7).

In this third embodiment of the present invention, the Via tag 222 is erased and only the Via tag 232 of the server itself is described in the unconverted message header 221. The UserID 223 in the From tag is converted into the tag 233, from which no UserID of the callee can be guessed, such as Anonymous, and the part 224 identifying SIP-URL is converted into 234, from which no UserID and its domain can be guessed. In addition, the part 225 identifying the Call-ID's domain is converted into part 235. The rule of message body (SDP) conversion is the same as that of the first embodiment of the present invention.

As described above, in the embodiment shown in FIG. 17, the Via tag indicating the relay point for the message can be deleted to prevent the call source from being guessed. Alternately, the part 225 identifying the Call-ID's domain can be converted into temporary DomainID 235, from which no domain can be guessed.

Figure 18:
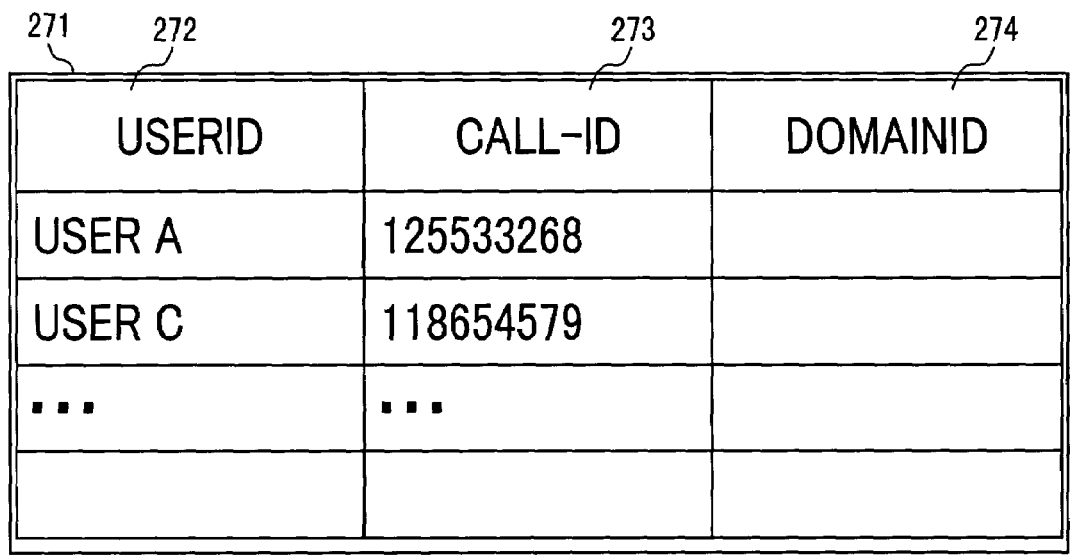
FIG. 18 is a diagram showing the content of a conversion table stored on a SIP server which has the message conversion function of the present invention.
Figure 19:
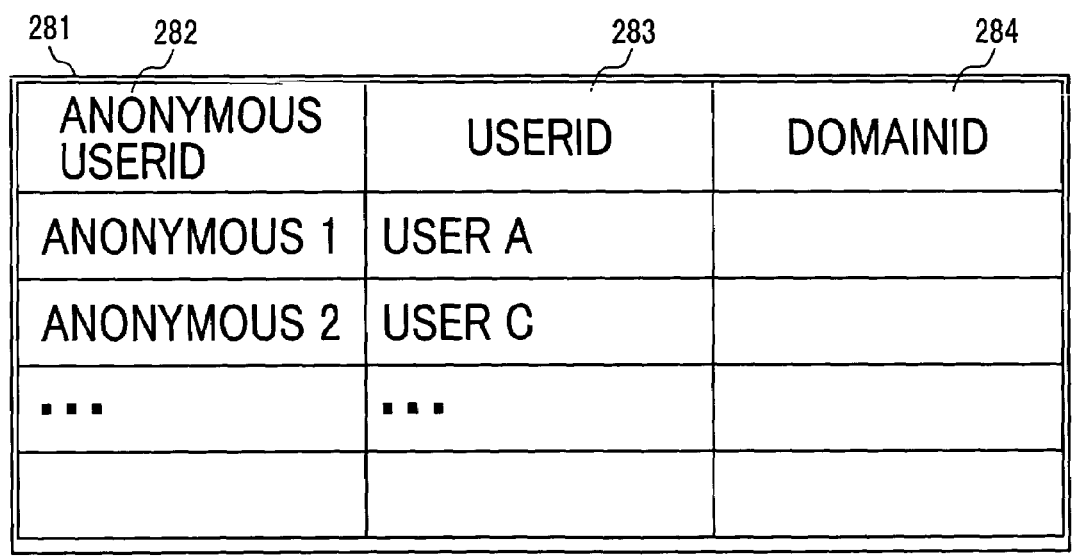
FIG. 19 is a diagram showing another example of the content of the conversion table stored on a SIP server which has the message conversion table of the present invention.

FIG. 18 and FIG. 19 are views showing the conversion tables stored on the SIP server 12-3 with the conversion function in the second embodiment of the present invention. These conversion tables include the table 271, which associates all the UserIDs converted into the same Call-ID 273 with their real UserIDs 272, the table 281, which associates anonymous UserIDs 282 previously stored on the SIP server as "Anonymous1-100" with their real UserIDs 283, and others. The use of these tables in routing SIP messages conceals information from the callee, ensuring information security.

Embodiment 4

Figure 20:
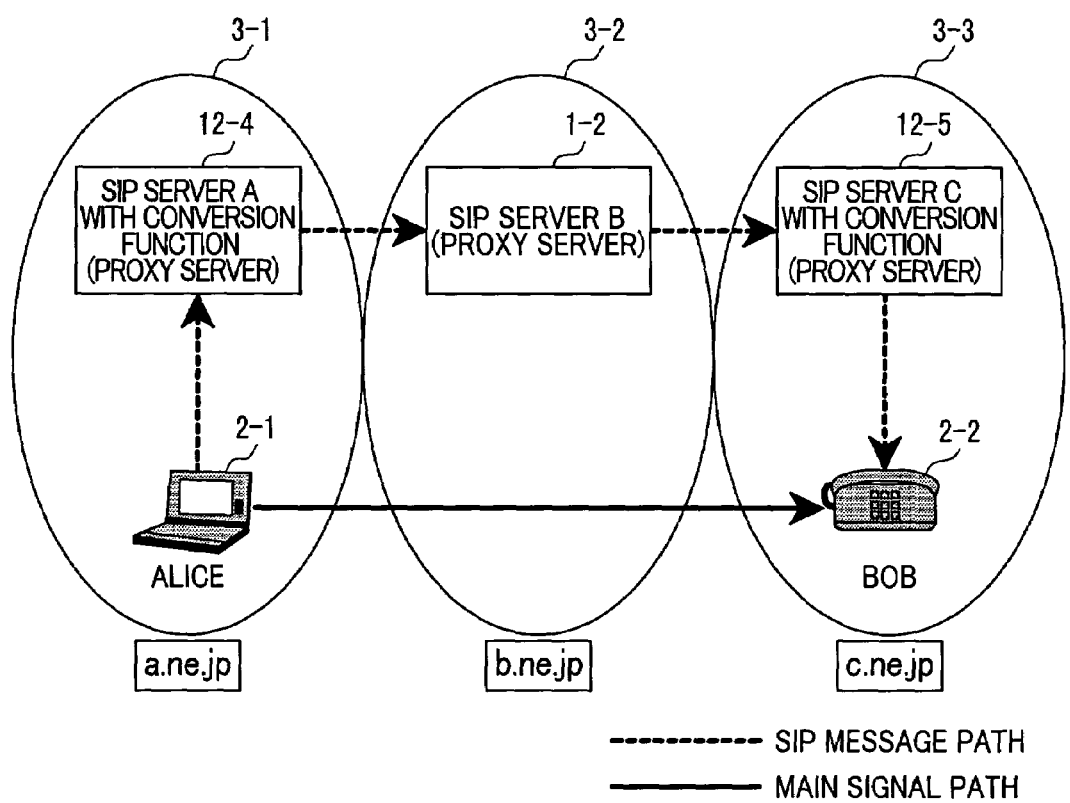
FIG. 20 is a schematic diagram showing a network using a SIP server which has the message conversion function of the present invention.
Figure 21:
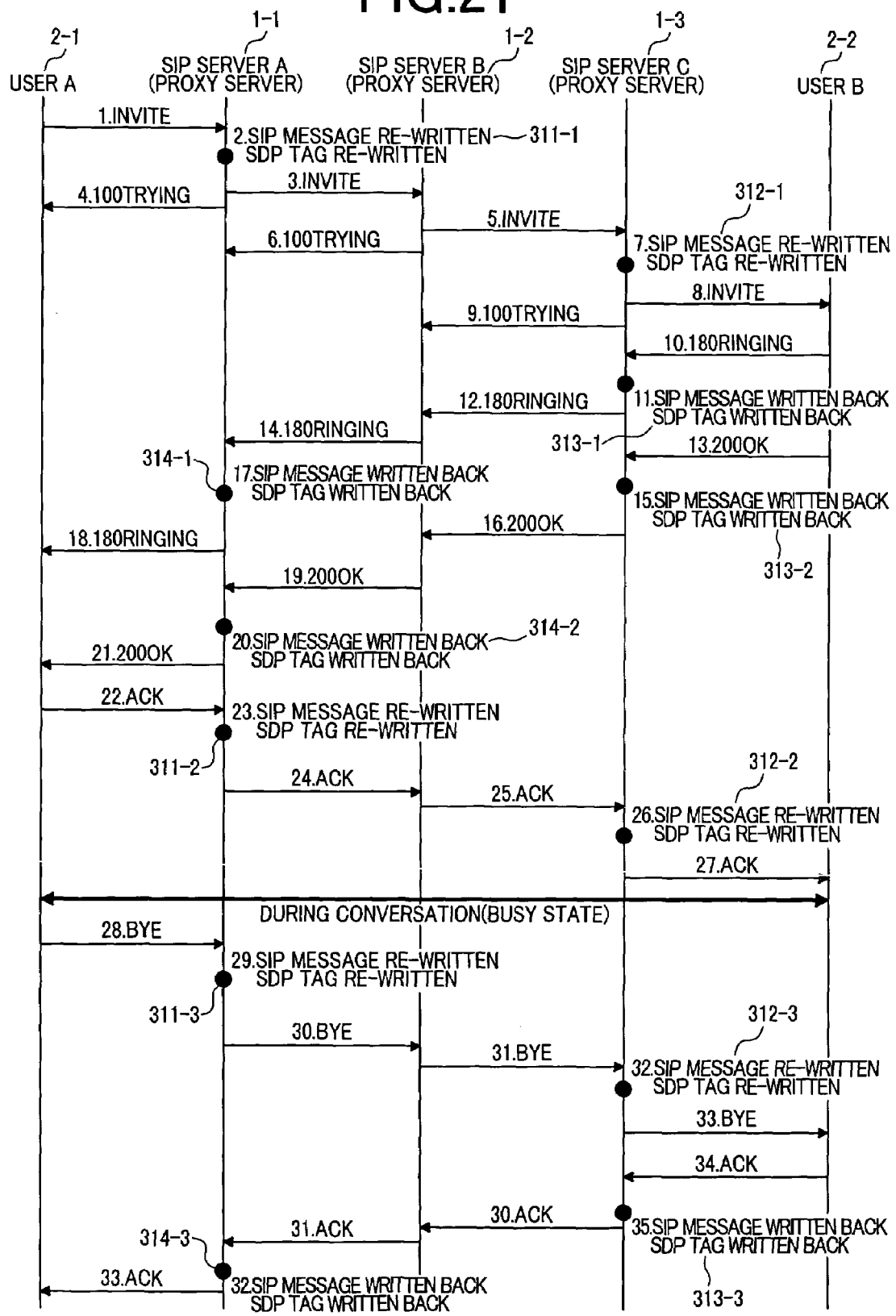
FIG. 21 is a sequence diagram showing the procedure for making a call in the network using the SIP server which has the message conversion function of the present invention.

FIG. 20 is a view showing the network configuration of the SIP server in the fourth embodiment of a present invention. FIG. 21 is a sequence diagram showing the procedure for processing conversation in the network of FIG. 20.

In the fourth embodiment of the present invention, UserA makes a Caller Anonymous Call. The step of converting the SIP message is performed on the SIP server A (124), with the header conversion function used by the caller in sending the SIP message at the steps 311 and 314, and on the SIP server C (12-5), with the header conversion function at the steps 312 and 313, which sends the SIP message to the callee in the sequence ranging from the start to the end of conversation as shown in FIG. 21. Note that the SIP server with the conversion, function behaves as described in connection with the first embodiment.

FIG. 22 is a diagram showing the content of the SIP message converted on the SIP server with the message conversion function. In fourth embodiment of the present invention, first, the UserIDs 322 and 323 of the From tag in the unconverted header 321 are converted into character strings 326 and 327, from which no UserID of the callee can be guessed, such as Anonymous, and the message body (SDP) is converted in accordance with the same rule as that of the first embodiment of the present invention. Second, the Via tag 332 in the unconverted header 331 is erased on the SIP server 12-5 and only the Via tag 336 of the server itself is described. The part 333 identifying SIP-URL in the From tag is converted into part 337, from which no DomainID can be guessed. The part 334 identifying the Call-ID's domain is converted into part 338.

FIG. 23 is a diagram showing the conversion table stored on the SIP server 12-4 with the conversion function. FIG. 24 is a view showing the conversion table stored on the SIP server 12-5 with the conversion function.

The conversion tables stored on the SIP server 12-4 include the table 341, which associates all the UserIDs converted into the same Call-ID 343 with their real UserIDs 342, the table 351, which associates anonymous UserIDs 352 previously stored on the SIP server as "Anonymous1-100" with their real UserIDs 353, and others. The conversion tables stored on the SIP server 12-5 include the table 361, which associates Call-ID 362 with DomainIDs 364, and others.

Embodiment 5

Figure 25:
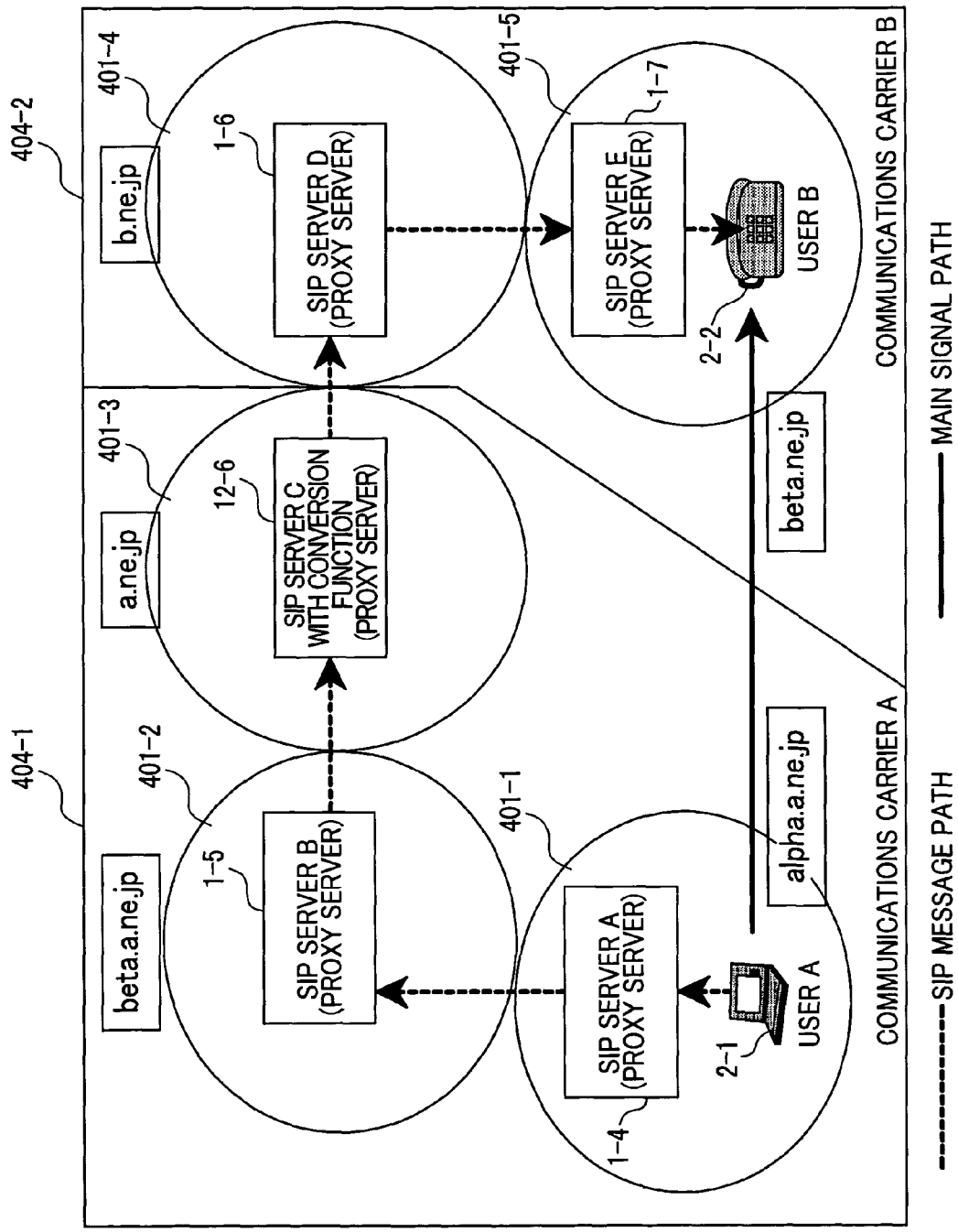
FIG. 25 is a diagram showing a network using a SIP server which has the message conversion function of the present invention.
Figure 26:
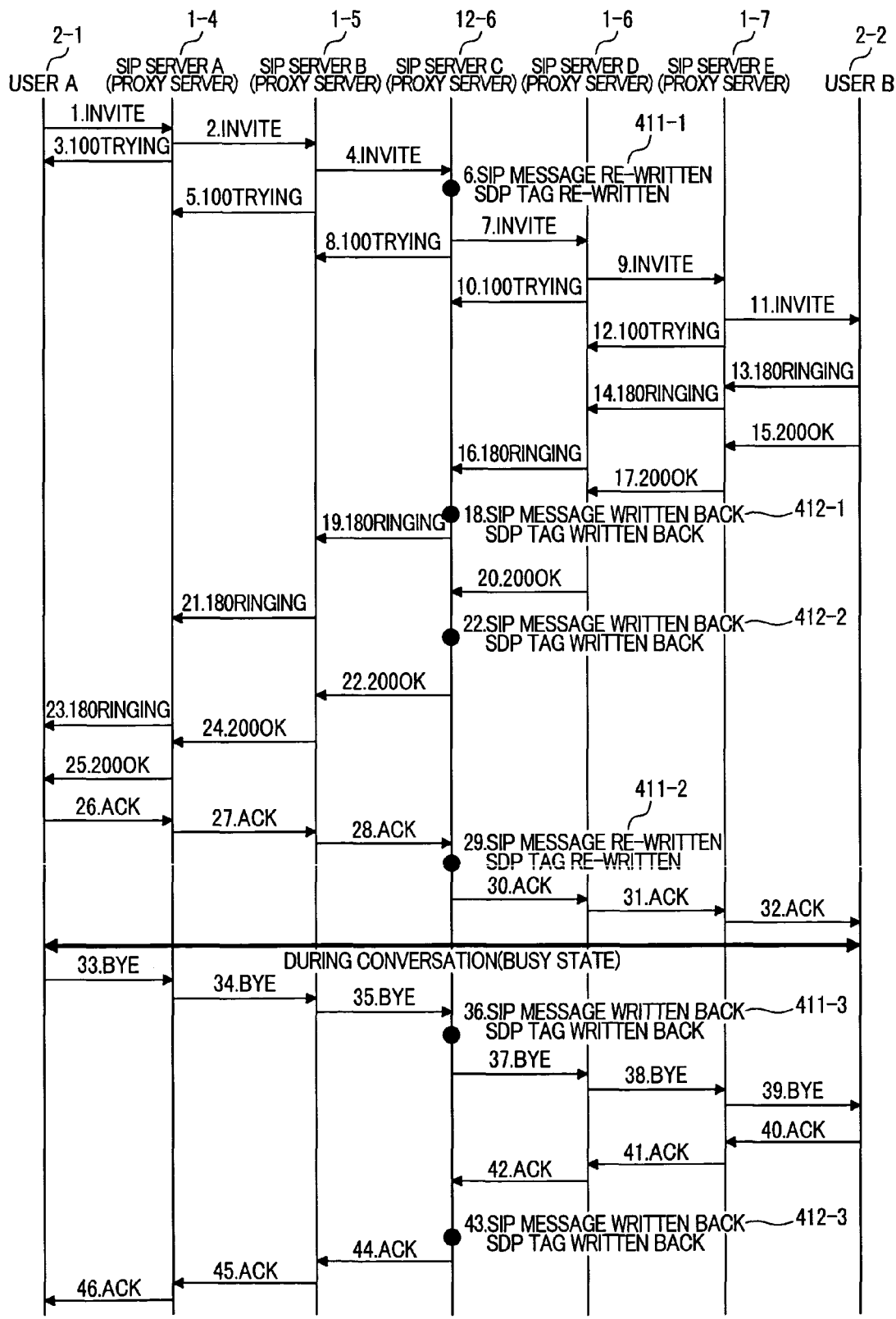
FIG. 26 is a sequence diagram showing the procedure for making a call in the network using a SIP server with the message conversion function of the present invention.

FIG. 25 is a schematic diagram showing the network structure in a fifth embodiment of the SIP server of the prevent invention. FIG. 26 is a sequence diagram showing the procedure for processing conversation in the network of FIG. 25.

In the fifth embodiment of the present invention, UserA make a Caller Anonymous Call to UserB. The step of converting the SIP message is performed on the SIP server C (12-6) with a header conversion function belonging to the top level domain for each communications carrier at the steps 411 and 412 in the sequence ranging from the start to the end of conversation, as shown in FIG. 26.

FIG. 27 is a diagram showing the content of the SIP message converted on the SIP server with the message conversion function in the fifth embodiment of the present invention. In the fifth embodiment of the present invention, the Via tag 421 is erased and only the Via tag 426 of the server itself, the communication carrier, is described in the unconverted message header 420. The UserID 422 and the part 423 identifying user's SIP-URL in the From tag are converted into character strings 427 and 428, from which no UserID of the callee can be guessed, such as Anonymous. In addition, the part 424 identifying the caller's domain in the Call-ID tag is converted into the top level domain 429 of the communication carrier. The rule of message body (SDP) conversion is the same as that of the first embodiment of the present invention. The conversion tables stored on the SIP server 12-6 with the conversion function in the fourth embodiment of the present invention are shown in FIG. 18 and FIG. 19, and the contents of these tables are the same in those of the second embodiment of the present invention.

Embodiment 6

Figure 28:
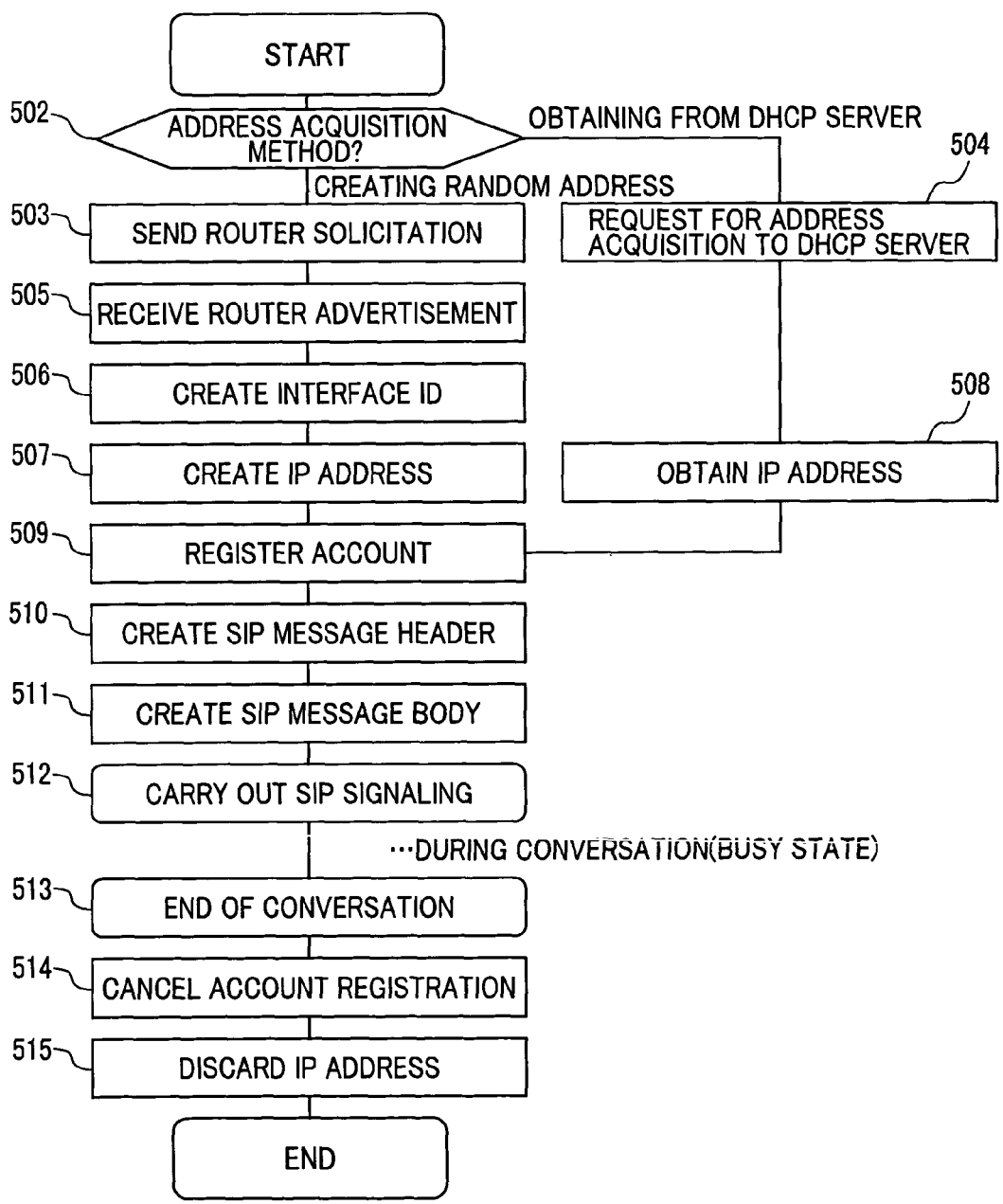
FIG. 28 is a flow chart showing the principle of operation of the IP Telephone of the present invention, ranging from the step of obtaining the temporary address to the step of discarding it.
Figure 29:
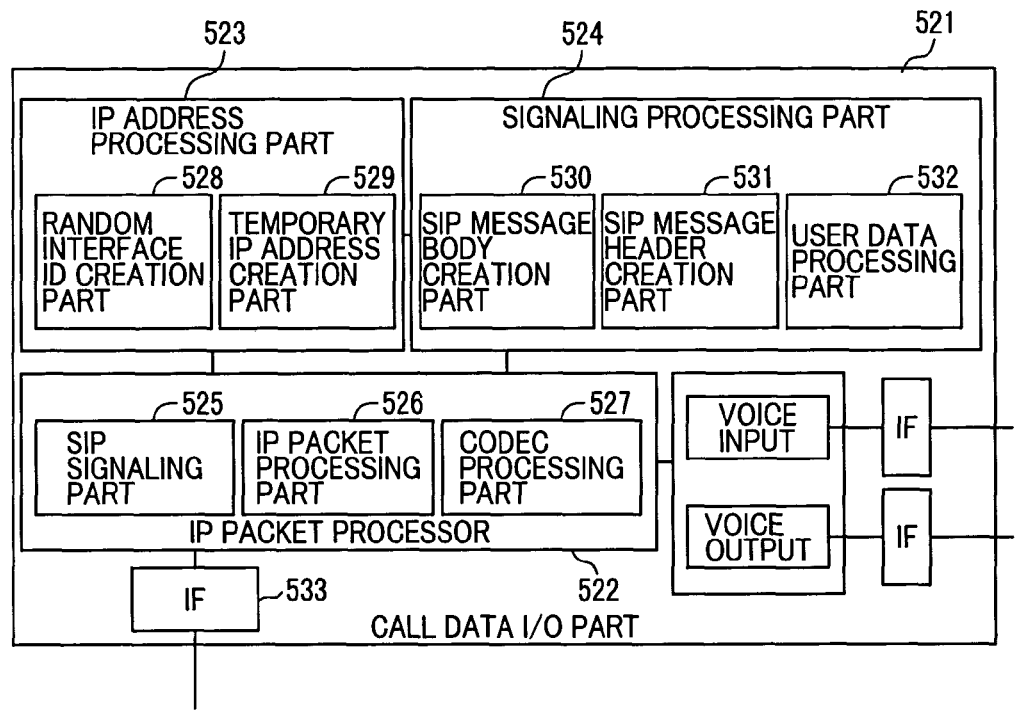
FIG. 29 is a block diagram showing the function of the IP Telephone of the present invention.
Figure 30:
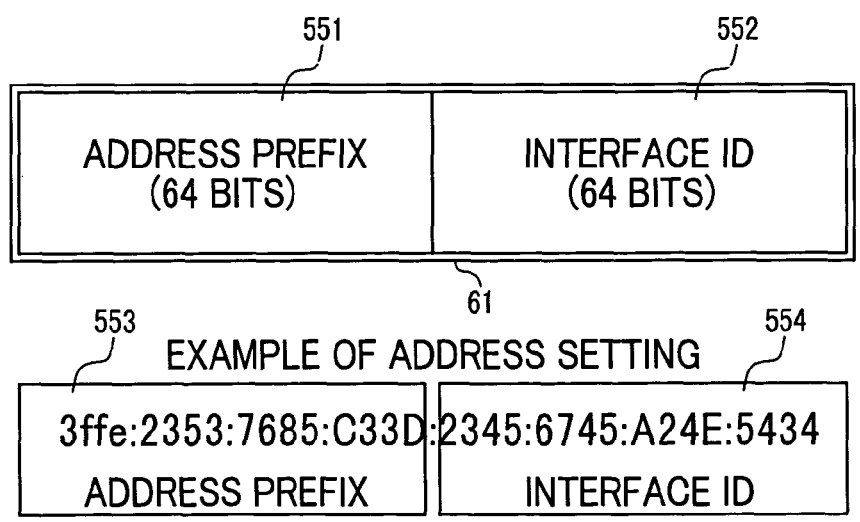
FIG. 30 is a systematic diagram of IPv6 addresses.

FIG. 28 is s flow chart illustrating the operational principle of the IP Telephone using the temporary IP address at conversation. FIG. 29 is a block diagram illustrating the function of the IP Telephone. The operational principle of the IP Telephone in the sixth embodiment of the present invention will be described below. FIG. 30 is a diagram of IPv6 addresses. FIG. 31 is a view showing the SIP message header used when a Caller Anonymous Call is made.

First, the procedure for initiating a call will be described. When the caller originates a call to another user, the IP Telephone 521 initiates the step of sending the SIP message and executes the step 502 of selecting the address acquisition method. If a random address creation method is selected, then the step 503 of sending Router Solicitation is performed to obtain an IPv6 address prefix 551 from a router in the same subnet. When the router sends Router Advertisement in response to Router Solicitation, a step 505 of receiving Router Advertisement is performed to obtain the address prefix 551.

Second, a step of creating an interface ID 506 is performed at the random interface ID creation part 528 to create an IPv6 interface ID552. The examples of the address prefix and the interface ID are represented by 553 and 554 in FIG. 30.

Third, a step 507 of creating an IP address is performed at a temporary IP address processing part 529 using the address prefix 501 and the interface ID552.

If the option of acquisition from the DHCP server is selected at the step 502 of selecting the address acquisition method, a request for address acquisition 504 is issued to any address distribution server, for example, the DHCP server, to execute a step 508 of obtaining the temporary IP address 508. Whenever an IP call is made through IPv4, the address should be obtained from an external server.

Fourth, the modified entry or new registration entry of user information is created at a user data processing part 532 using the temporary address and the UserID to execute a step 509 of registering the user's account.

Fifth, a step 510 of creating the SIP message at a SIP message header creation part 531 and a step 511 of creating the SIP message body at a SIP message body creation part 530 are performed, respectively.

As shown in FIG. 31, if it is desired to making a call with the UserID of the caller concealed from the callee, a flag indicating the SIP server through which a Caller Anonymous Call is to be made is described in the SIP message header 560, for example, a numeric value 184 (561) attached to the position directly before the telephone number of callee in the case of making a Caller Anonymous Call at an exchange-based telephone system or extended header (571).

Then, the steps of creating a SIP Start Line INVITE, indicating a request to the callee, and creating the SIP message at a SIP signaling generation part 525, and the steps of creating the IP packet 60 and sending the DIP signal 512 at an IP packet processing part 526 are performed, respectively, to initiate conversation.

At the end of the conversation, a step 514 of erasing the account registration entry is performed at the user data processing part 532 to erase the account from the SIP server, and a step 515 of discarding the IP address is performed at the temporary IP address processing part 529, respectively, to complete the process.

The procedure for receiving the SIP message is the same as that used for sending it, with the exception that the step of obtaining the temporary address and the step of registering the account are performed when the IP Telephone is powered on or when the IP Telephone logs in the domain managed by the SIP server, the SIP message is received, conversation is carried out, the temporary IP address is discarded at the end of the conversation, and immediately thereafter, a new temporary IP address is obtained for account registration.

As can be seen from the description set forth above, the IP Telephone has two temporary IP addresses, one for sending and one for receiving, while the IPv4 telephone set has either one of them, because two addresses cannot be set on one terminal at the same time.

The callee receiving the SIP signal from the SIP server with header conversion function according to the embodiment of the present invention described above can recognize that the caller is making a Caller Anonymous Call by checking the converted UserID indicating anonymous in the SIP message.

If the DomainID in the SIP message has been converted or erased for concealing one party's information from the other, the callee receiving the SIP message cannot know the caller's domain. Thus, a malicious third party, even when receiving the SIP message sent by the caller, finds it difficult to guess the caller because the UserID is concealed.

The callers can be managed by any organization, for example, a communications carrier, because the SIP server contains the conversion tables associating real UserIDs with their other parameters.

With the IP Telephone using temporary IP addresses according to the embodiment of the present invention, the IP address is modified for each call, making it difficult for a malicious third party to guess the identity of the caller, even when he/she intercepts the IP packet during conversation.

In addition, when the SIP message is sent through IPv6, it is difficult for the third party to guess the identity of the caller because many IP addresses are described in the same segment.

What is claimed is:

1. A method for making an Internet Protocol (IP) call comprising the steps of:
   checking a Session Initiation Protocol (SIP) message for any request for an Anonymous Call;
   performing at least one of the operations of modification and erasure, on said at least part of the SIP message, if the request is detected;
   sending the SIP message processed as described above;
   modifying an original caller's address to a temporary address at the initiation of a conversation;
   discarding the temporary address at the end of the conversation;
   determining whether a random address is created or not;
   obtaining an Internet Protocol version 6 (IPv6) address prefix from a router in the same subnet if the random address is created;
   creating an interface ID;
   creating a temporary IP address from the IPv6 address prefix and the interface ID;
   creating a modified entry or a new registration entry of user information using the temporary IP address and a UserID to register the user's account; and
   canceling an account registration and discarding the IP address at the end of the conversation.

2. A method for making an IP call according to claim 1, wherein the address is obtained from an external server to use as the caller's address in the case of making an IP call through Internet Protocol version 4 (IPv4).

3. A method for making an IP call according to claim 1, wherein the caller's address is the IPv6 address and the address with random values tilled is created as the temporary address.

4. A method for making an IP call according to claim 1, wherein the caller's address is the IPv6 or an Internet Protocol version 4 (IPv4) address, the address is first received from an address distribution server in conjunction with message sending, and the address is discarded at the end of the conversation.

5. A method for making an IP call according to claim 1, wherein the caller's address is the IPv6 address and two different addresses, one address for message sending and another address for message receiving, are set, the former address being discarded at the conversation once and immediately after then, a new one being created while the latter is created at the time of message sending and discarded at the end of the conversation.

6. A method for making an IP call according to claim 1, further comprising the steps of:
   performing the modification operation on said at least part of the SIP message, if the request for an Anonymous Call is detected; and
   creating a table containing the correspondence between unconverted and converted contents of the message.

7. A system for making an Internet Protocol (IP) call comprising:
   a server; and
   a plurality of terminals,
   wherein the server comprises means for checking the Session Initiation Protocol (SIP) message for any request for an Anonymous Call, performing at least one of the operations of modification and erasure, on said at least part of the SIP message, if the request is detected, sending the SIP message processed as described above, and modifying an original caller's address to a temporary address at the initiation of a conversation, and discarding the temporary address at the end of the conversation, and
   wherein the plurality of terminals comprises means for determining whether a random address is created or not, obtaining an Internet Protocol version 6 (IPv6) address prefix from a router in the same subnet if the random address is created, creating an interface ID, creating a temporary IP address from the IPv6 address prefix and the interface ID, creating a modified entry or a new registration entry of user information using the temporary IP address and a UserID to register the user's account, and canceling an account registration and discarding the IP address at the end of the conversation.

8. A system for making an IP call according to claim 7, wherein the address is obtained from an external server to use as the caller's address in the case of making an IP call through Internet Protocol version 4 (IPv4).

9. A system for making an IP call according to claim 7, wherein the caller's address is the IPv6 address and the address with random values filled is created as the temporary address.

10. A system for making an IP call according to claim 7, wherein the caller's address is the IPv6 or an Internet Protocol version 4 (IPv4) address, the address is first received from an address distribution server in conjunction with message sending, and the address is discarded at the end of the conversation.

11. A system for making an IP call according to claim 7, wherein the caller's address is the IPv6 address and two different addresses, one address for message sending and another address for message receiving, are set, the former address being discarded at the conversation once and immediately after then, a new one being created while the latter is created at the time of message sending and discarded at the end of the conversation.

12. A system for making an IP call according to claim 7, wherein the server further comprises the means for performing the modification operation on said at least part of the SIP message, if the request for an Anonymous Call is detected and creating a table containing the correspondence between unconverted and converted contents of the message.

* * * * *